United States Patent
Batra et al.

(10) Patent No.: US 7,492,702 B2
(45) Date of Patent: Feb. 17, 2009

(54) VERSATILE SYSTEM FOR OPTIMIZING DATA FRAGMENTATION IN DIGITAL COMMUNICATIONS

(75) Inventors: Anuj Batra, Dallas, TX (US); Jin-Meng Ho, Plano, TX (US); Srinivas Lingam, Richardson, TX (US); Jaiganesh Balakrishnan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 601 days.

(21) Appl. No.: 11/191,738

(22) Filed: Jul. 28, 2005

(65) Prior Publication Data

US 2006/0034333 A1    Feb. 16, 2006

Related U.S. Application Data

(60) Provisional application No. 60/592,303, filed on Jul. 28, 2004.

(51) Int. Cl.
*H04J 11/00* (2006.01)

(52) U.S. Cl. .................................. 370/208; 370/203

(58) Field of Classification Search ............... 370/203, 370/208, 389, 349, 470, 471, 473, 474, 476
See application file for complete search history.

(56) References Cited

U.S. PATENT DOCUMENTS

| | | | | |
|---|---|---|---|---|
| 2002/0051435 A1* | 5/2002 | Giallorenzi et al. | ......... | 370/335 |
| 2002/0080820 A1* | 6/2002 | Hashem et al. | ............. | 370/471 |
| 2002/0167962 A1* | 11/2002 | Kowalski | ................... | 370/445 |

* cited by examiner

*Primary Examiner*—Brenda Pham
(74) *Attorney, Agent, or Firm*—Steven A. Shaw; W. James Brady; Frederick J. Telecky, Jr.

(57) ABSTRACT

The present invention provides a versatile system for optimizing data fragmentation in a digital communications—particularly OFDM communications—system. A digital transmission system (100) is provided, having a PHY-level constraint. An array (104, 112) of data transmission parameters (106-110, 114-116), relating to the digital transmission system, is provided. A fragmentation construct (102) is provided, and adapted to determine a number of symbols required to transmit a given data transmission payload. The fragmentation construct calculates (118), based on the number symbols required, and on certain parameter information from the array, a number of bytes of data that must be transmitted in the given data transmission payload in order to minimize pad bits added to the data transmission payload.

10 Claims, 1 Drawing Sheet

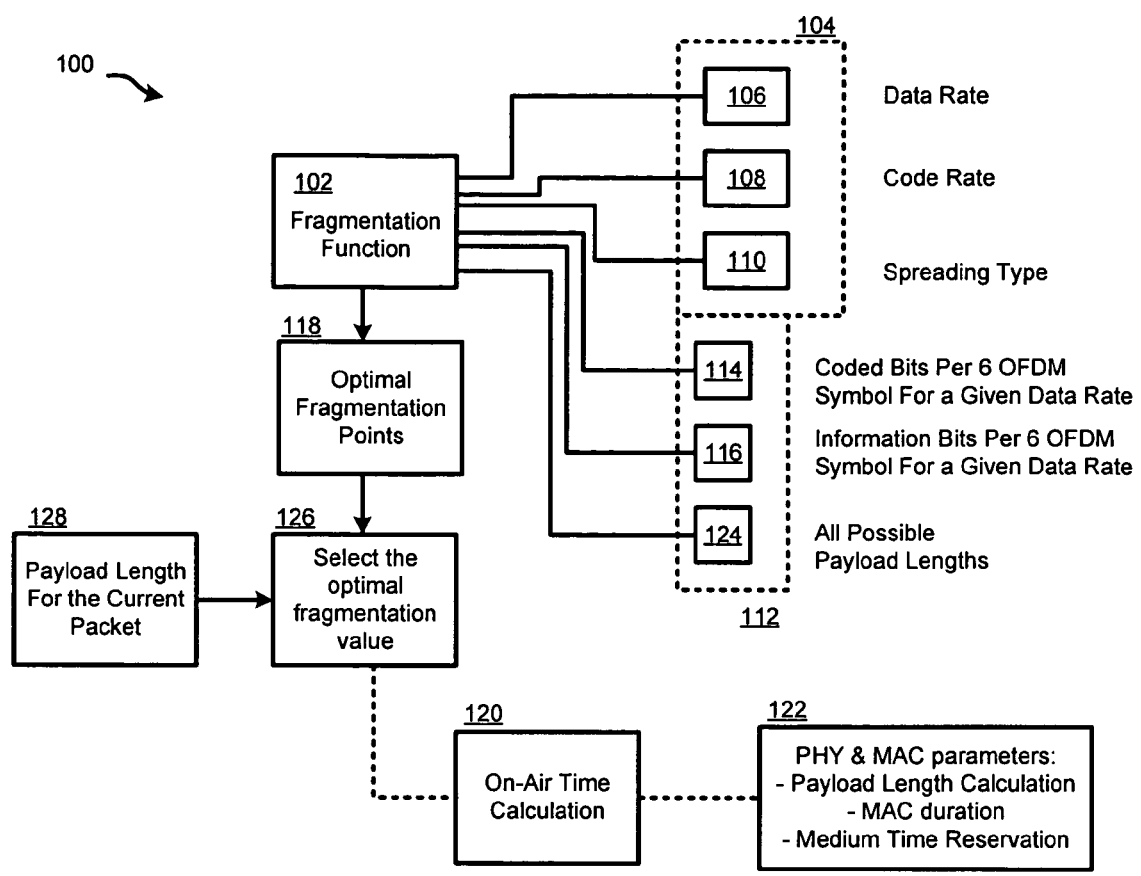

VERSATILE SYSTEM FOR OPTIMIZING DATA FRAGMENTATION IN DIGITAL COMMUNICATIONS

PRIORITY CLAIM

This application claims priority of U.S. Provisional Application No. 60/592,303, filed Jul. 28, 2004.

TECHNICAL FIELD OF THE INVENTION

The present invention relates generally to the field of wireless communications and, more particularly, to constructs and methods for optimizing fragmentation sizes in digital communications to maximizing on-air throughput.

BACKGROUND OF THE INVENTION

Increasing demand for more powerful and convenient data and information communication has spawned a number of advancements in communications technologies, particularly in wireless communication technologies. A number of technologies have been developed to provide the convenience of wireless communication in a variety of applications, in various locations. This proliferation of wireless communication has given rise to a number of manufacturing and operational considerations.

Since wireless communications rely on over-the-air (OTA) transmissions, wireless systems and their operation are subjected to a number of regulatory requirements and restrictions. These regulatory influences can vary considerably, and even conflict, across different countries or regions. Wireless device manufacturers and service providers often develop industrial standards to define specific communication schemes, and to help reconcile competing or conflicting approaches thereto.

Among the emerging communication technologies, ultra-wideband (UWB) technology is gaining support and acceptance for wireless transmission of video, audio or other high bandwidth data between various devices. Generally, UWB is utilized for short-range radio communications—typically data relay between devices within approximately 30 feet—although longer-range applications may be developed. A conventional UWB transmitter operates a very wide spectrum of frequencies, several GHz in bandwidth. UWB may be defined as radio technology that has either: 1) a spectrum that occupies bandwidth greater than 20% of its center frequency; or, as it is more commonly understood, 2) a bandwidth $\geq 500$ MHz.

UWB systems commonly utilize a modulation scheme, known as Orthogonal Frequency Division Modulation (OFDM), to organize or allocate data transmissions across extremely wide bandwidths. OFDM schemes are commonly utilized, not only in UWB systems, but also in narrow-bandwidth communications systems and protocols such as 802.11 (a).

Often, particularly in UWB systems, OFDM schemes are supplemented by dividing a given frequency range into multiple sub-bands. Systems that utilize these multiple sub-bands in combination with OFDM modulation are commonly known as Multi-band OFDM. Multi-band OFDM (MBOFDM) in a UWB system provides relatively low-power, broad-spectrum communication that enables high bandwidth data transfer.

MBOFDM systems and standards have provided a number of advancements intended to improve the potential communication bandwidth associated with such systems. Operational constructs within such systems are routinely expanded in terms of capacity. Consider, for example, an interleaver function within an OFDM system. Certain MBOFDM systems may comprise interleaver functions that are capable of processing relatively large data packets—as many as six or more OFDM symbols in length, for example. In an MBOFDM system where the interleaver boundary is six OFDM symbols, transmission packet lengths must be a multiple of six OFDM symbols.

Given wide variances in data transmission needs, however, it is entirely possible that the last segment of data to be communicated occupies something substantially less than a full six OFDM symbols. Consider, for example, a case where data to be communicated slightly exceeds a full six OFDM symbols. Data in the full six OFDM symbol packet may be transmitted, but the remainder data must be supplemented to form a full six-symbol packet. In such a situation, nearly six symbols worth of pad bits (i.e., useless "filler" data) may be needed to form a full packet for transmission. OTA transmission of such useless data reduces the efficiency and effective throughput such systems.

As a result, there is a need for a system that provides optimal data fragmentation for OTA transmissions—one that minimizes the volume of pad bits transmitted and maximizes the effective throughput of an OTA transmission channel—in an easy, efficient and cost-effective manner.

SUMMARY OF THE INVENTION

The present invention provides a versatile system, comprising various constructs and methods, for maximizing utilization and efficiency of OTA transmissions by optimizing data fragmentation. The system of the present invention provides optimization of data fragmentation that minimizes the volume of pad bits transmitted OTA. The present invention is readily adaptable to a number of design requirements and variables—and may be implemented utilizing constructs and components already present in conventional wireless devices. The system of the present invention thus maximizes the effective throughput of an OTA transmission channel in an easy, cost-effective manner.

Specifically, the present invention provides various structures and methods for optimizing data fragmentation in a digital communications system—particularly a MBOFDM communications system. A digital transmission system is provided, having a PHY-level constraint. An array of data transmission parameters, relating to the digital transmission system, is provided. A fragmentation construct determines the set of packet lengths that minimize the overhead in the system and then choose a fragmentation size that is close to one of these packet lengths. The fragmentation construct calculates—based on the number of symbols required, and on certain parameter information from the array—a number of bytes of data that must be transmitted in the given data transmission payload in order to minimize the number of pad bits added to the data transmission payload.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which:

FIG. 1 provides an illustration depicting one embodiment of a communications system in accordance with certain aspects of the present invention.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The present invention is hereafter illustratively described primarily in conjunction with the design and operation of an ultra-wideband (UWB) communications system. Certain aspects of the present invention are further detailed in relation to design and operation of multi-band Orthogonal Frequency Division Multiplexing (OFDM) communications system. Although described in relation to such structures, the teachings and embodiments of the present invention may be beneficially implemented with a variety of data transmission or communication systems or protocols (e.g., IEEE 802.11), depending upon the specific needs or requirements of such systems. The specific embodiments discussed herein are, therefore, merely demonstrative of specific ways to make and use the invention and do not limit the scope of the invention.

The present invention provides a versatile system, comprising various constructs and methods, for maximizing utilization and efficiency of OTA transmissions by optimizing data fragmentation. The system of the present invention provides optimization of data fragmentation that minimizes the volume of pad bits transmitted OTA, and maximizes the effective throughput of an OTA transmission channel. The present invention is readily adaptable to a number of design requirements and variables—and may be implemented utilizing a wide variety of constructs and components.

As previously noted, a number of MBOFDM systems may comprise, in the physical layer (PHY), interleaver functions that are capable of processing relatively large data packets—as many as six or more OFDM symbols in length, for example. For purposes of explanation and illustration, certain aspects of the present invention are described hereinafter in reference to a quantization of six OFDM symbols—i.e., an MBOFDM system where, in the PHY layer, the interleaver boundary is six OFDM symbols, and transmission packet lengths must be a multiple of six OFDM symbols.

Given wide variances in data transmission applications and their respective needs, however, it is entirely possible—if not routine—that the last portion of data intended for transmission occupies something substantially less than a full six OFDM symbols. Where this occurs, some number of pad bits must be appended to that data in order to complete the full six symbol packet. Consider, for example, a case where data to be communicated slightly exceeds a full six OFDM symbols. Data in the full six OFDM symbol packet may be transmitted, but the remainder data must be supplemented to form another full six-symbol packet. In such a situation, nearly six symbols worth of pad bits (i.e., useless "filler" data) is needed to form a full packet for transmission. OTA transmission of such large segments of essentially useless data occupies valuable transmission bandwidth, and reduces the efficiency and effective throughput of such systems.

The present invention recognizes that, in many MBOFDM applications, operational and performance characteristics of certain signal processing or transmission components are known beforehand. Comprehending this, the present invention utilizes such information to determine, in operational layers above the PHY layer (e.g., the MAC layer), a data fragmentation for a given data transmission that optimizes OTA throughput. Depending upon the nature of the components in the system and their operational characteristics, this determination may comprise a one-time, static calculation—from which a look-up table of fragmentation values may be stored in memory—or, in alternative embodiments, may comprise a dynamic, "real-time" calculation and adjustment scheme.

Referring now to FIG. 1, a functional diagram of a MBOFDM communication system 100, according to certain aspects of the present invention, is illustrated. System 100 comprises a fragmentation function or construct 102, provided in an upper operational layer (e.g., MAC layer). Construct 102 accesses or is provided with some array 104 of information relating to various system transmission parameters. Array 104 may be some pre-determined compilation of information stored, for example, in a memory function somewhere within system 100, or array 104 may be some dynamically registered data compiled as new transmit or receive devices access a system. Array 104 may comprise any number of useful system parameters, but will generally comprise data transmission rate information 106, code rate information 108, and a spreading characteristic 110. Other similar parameters, and various combinations thereof, may be provided in alternative embodiments.

System 110 may also comprise a sub-array 112 of parameters associated with or calculated from entries in array 104. For example, sub-array 112 may comprise a parameter 114 corresponding to the number of coded bits per 6 symbols for a given data rate, or a parameter 116 corresponding to number of information bits per 6 symbols for a given data rate. Sub-array 112 may reside within array 104, or may be functionally associated therewith in some other fashion.

Fragmentation function 102 performs some calculation 118 of optimal fragmentation points for a given set of parameter from array 104. Depending upon the operational nature of system 100, calculation 118 may be a one-time operation performed at system start-up or configuration, or it may be an on-going dynamic operation, or some combination thereof. Depending upon the nature of calculation 118, it may load, store or otherwise populate data in array 112, either on a one-time or dynamic basis, or may provide the result to some real-time processing function. Array 124 includes all possible payload lengths as allowed by the standard. Block 126 selects the optimal fragmentation value. This value is a function of the payload length for the current packet/frame under consideration. Array or register 128 is an array or register that contains the tentative or anticipated payload length as provided by the MAC or host.

In certain embodiments, system 100 may further comprise an airtime calculation construct 120 that utilizes information from arrays 104 and 112 to calculate on on-air transmission time for a payload of a given size. This determination may then be provided to an arbitration function 122 that uses the payload transmission time calculations to cycle components in the PHY level on and off correspondingly—improving power consumption and data throughput characteristics for system 100.

The functional elements of the constructs, functions or systems described hereinabove may be implemented in a variety of ways—relying on software, hardware, or combinations of both. Dynamic functions may be implemented as algorithms, whereas static information functions may be implements as some form of look-up table or matrix.

Although various constructs or function may be depicted as either separate or integrated functional instances, the constituent elements of the present invention may be integrated, separated or combined as necessary or convenient for design purposes. Certain embodiments may be provided as functions within a single semiconductor device or chipset, or may be provided as sub-portions of software operating with a processor. In other embodiments, interoperable functions may be provided within disparate components within a communications system. Other combinations and alternatives, operating in accordance with the teachings of the present invention, are hereby comprehended.

The system of the present invention exploits constraints of the MBOFDM PHY layer—particularly the quantization constraint—to provide a packet fragmentation aligned on the corresponding OFDM symbol boundary. For purposes of explanation and illustration, consider a system in which data rate is 53.3 Mbps and quantization constraint is 6 OFDM symbols. The minimum non-zero packet size—corresponding to 6 OFDM symbols—contains a maximum of 62 information bits. The system's MAC processes information in units of bytes—thus, the minimum non-zero packet size contains a maximum of 7 bytes of information. Thus, time to transmit a payload of size 1 byte is the same as time to transmit a payload of size 7 bytes. In order to maximize on-air throughput, it is therefore desirable to transmit 7 bytes of information—rather than something smaller—when possible.

This example may be generalized to provide a construct through which a payload size that minimizes the number of pad bits for each symbol, given certain system parameters, may be determined. This construct thereby maximizes the on-air throughput at the system's PHY layer. This determination of the optimal fragmentation points for any given data rate may be factored from the expression:

$$n_B = \left\lfloor \frac{m \times N_{IBP6S} - 38}{8} \right\rfloor \quad (1)$$

where m=1, 2, 3 . . . , and represents the number of 6 OFDM symbols needed to transmit the payload; $N_{IBP6S}$ is the number of information bits per 6 OFDM symbols; and $n_B$ is the number of bytes that must be transmitted in the payload in order to optimize a minimum number of pad bits added to a packet. The value of 38 represents the bits consumed by frame check sequence bits and tail bits.

In conjunction with these operations, system parameter information of the type that may reside in arrays 104 or 112 may be provided for a wide range of operational parameters. One example of such a compilation in illustrated in Table 1, below. The information bits in Table 1 may include the FCS (4 bytes) and tail bits (6 bits).

TABLE 1

| Rate (Mbps) | Code Rate (R) | Spreading Characteristic | # Coded bits/ 6 Symbols ($N_{CBP6S}$) | # Info bits/ 6 Symbols ($N_{IBP6S}$) |
|---|---|---|---|---|
| 53.3 | 1/3 | Frequency, Time | 300 | 100 |
| 80 | 1/2 | Frequency, Time | 300 | 150 |
| 106.7 | 1/3 | Time | 600 | 200 |
| 160 | 1/2 | Time | 600 | 300 |
| 200 | 5/8 | Time | 600 | 375 |

TABLE 1-continued

| Rate (Mbps) | Code Rate (R) | Spreading Characteristic | # Coded bits/ 6 Symbols ($N_{CBP6S}$) | # Info bits/ 6 Symbols ($N_{IBP6S}$) |
|---|---|---|---|---|
| 320 | 1/2 | — | 1200 | 600 |
| 400 | 5/8 | — | 1200 | 750 |
| 480 | 3/4 | — | 1200 | 900 |

The calculation from Equation (1), above, may be re-factored to assist in determining the on-air time for a given payload, rendering:

$$m = \left\lceil \frac{8 \times P_L + 38}{N_{IBP6S}} \right\rceil \quad (2)$$

where $P_L$ is the size of the packet, in units of bytes, and m is the number of 6 OFDM symbols needed to transmit a payload (i.e., data payload, plus 38 bits consumed by frame check sequence bits, tail bits, and pad bits). $P_L$ only represents the information data (or user data) provided by the MAC and it does not include FCS or 6 tail bits.

From known system parameters, the unit on-air time for a given 6 OFDM symbol packet may be determined—e.g., 1.875 μs. Thus, the on-air time for a given payload is given by:

$$t_{on\text{-}air} = (1.875 \times m) \mu s. \quad (3)$$

The transmission time of any given frame may thus be calculated, providing a number of arbitration and allocation improvements. For example, this data may be utilized to set MAC duration values, reserve medium times, or set arbitrations schemes between disparate components that might otherwise experience data collisions.

The embodiments and examples set forth herein are therefore presented to best explain the present invention and its practical application, and to thereby enable those skilled in the art to make and utilize the invention. However, those skilled in the art will recognize that the foregoing description and examples have been presented for the purpose of illustration and example only. For example, aspects of the present invention have been described above in relation to MBOFDM applications. The teachings and principles of the present invention are also applicable or adaptable to other applications or protocols. The description as set forth herein is therefore not intended to be exhaustive or to limit the invention to the precise form disclosed. As stated throughout, many modifications and variations are possible in light of the above teaching without departing from the spirit and scope of the following claims.

What is claimed is:

1. A method of determining an optimal size for a data transmission payload to maximize on-air throughput in an Orthogonal Frequency Division Modulation (OFDM) communications system, the method comprising:

determining a number 'm' of groups of OFDM symbols to be transmitted in a packet of the data transmission payload, wherein each one of the 'm' groups includes 'k' OFDM symbols;

determining the optimal size '$n_B$' of the data transmission payload given by $$n_B = \left\lfloor \frac{m \times N - O}{8} \right\rfloor,$$

wherein '$n_B$' is the number of bytes to be transmitted in the data transmission payload;

'N' is number of information bits to be transmitted in each 'm' groups of OFDM symbol; and 'O' is number of overhead bits required for the data transmission payload;

computing a plurality of optimal sizes of the data transmission payload corresponding to a plurality of given value of information bits to be transmitted;

storing the plurality of optimal sizes of the data transmission payload; and using an optimal size for the data transmission payload according to a given number information bits to be transmitted in each payload.

2. A method according to claim 1, wherein each one of the 'm' groups of OFDM symbols includes six OFDM symbols.

3. A method according to claim 1, wherein each one of the 'm' groups of OFDM symbols include at least one OFDM symbol.

4. A method according to claim 1, wherein the overhead bits include at least one or more of frame check sequence (FCS) bits and tail bits.

5. A method according to claim 4, wherein there are at least 38 overhead bits comprising at least 32 FCS bits and at least six tail bits.

6. A method according to claim 1, further comprising: determining on-air time '$t_{on\text{-}air}$' for the data transmission payload, wherein $t_{on\text{-}air}$=T * m;

$$m = \left\lceil \frac{8 \times P_L + O}{N} \right\rceil;$$

$P_L$ is a number of information bits in a given packet of the data transmission payload; and T is the amount of time each one of the 'm' groups of OFDM symbols is on-air.

7. A method according to claim 6, wherein there are 38 overhead bits and T is about 1.875 microseconds.

8. A method according to claim 1, wherein the optimal size of the data transmission payload is determined prior to transmitting the OFDM symbols.

9. A method according to claim 1, wherein the optimal size of the data transmission payload is determined during the transmission of OFDM symbols.

10. A method according to claim 9, wherein '$n_B$' is the number of bytes that must be transmitted in the payload in order to optimize a minimum number of pad bits added to the packet.

* * * * *